(12) United States Patent
Sekaran et al.

(10) Patent No.: US 10,805,379 B2
(45) Date of Patent: Oct. 13, 2020

(54) TECHNIQUES OF VIDEO UPDATE ON A CLIENT BASED ON BROWSER STATUS

(71) Applicant: American Megatrends International, LLC, Norcross, GA (US)

(72) Inventors: Gopinath Sekaran, Sholinghur (IN); Venkatesan Balakrishnan, Chennai (IN); Jasmine Francisca S, Villianur (IN); Mohammed Javith Akthar M, Erode (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 16/138,151

(22) Filed: Sep. 21, 2018

(65) Prior Publication Data

US 2020/0099737 A1 Mar. 26, 2020

(51) Int. Cl.
*H04L 29/08* (2006.01)
*G06F 9/54* (2006.01)
*G06F 11/30* (2006.01)
*G06F 1/3209* (2019.01)

(52) U.S. Cl.
CPC ............ *H04L 67/025* (2013.01); *G06F 9/542* (2013.01); *G06F 11/3055* (2013.01); *H04L 67/2814* (2013.01); *G06F 1/3209* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 2002/0052935 | A1* | 5/2002 | Paxhia | H04L 41/082 709/220 |
| 2005/0097445 | A1* | 5/2005 | Day | H04L 41/5029 715/255 |
| 2014/0281894 | A1* | 9/2014 | Maity | G06F 9/452 715/234 |

OTHER PUBLICATIONS

Intel Server Boards S2600WP. Revision 1.6 (Year: 2014).*
Supermicro, Dec. 22, 2017, IPMI View User Guide Revision 2.14.*

* cited by examiner

*Primary Examiner* — Hermon Asres
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. The computer system includes a BMC of a host. The BMC redirects images from the host to a device for displaying at a redirection display. The BMC further receives an indication that the redirection display is no longer in an active mode. The BMC then stops redirecting the images from the BMC to the device in response to the indication.

12 Claims, 6 Drawing Sheets

TECHNIQUES OF VIDEO UPDATE ON A CLIENT BASED ON BROWSER STATUS

BACKGROUND

Field

The present disclosure relates generally to computer systems, and more particularly, to a baseboard management controller (BMC) that provides video update to a client based on a status of a browser on the client.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

When a client browser is minimized or out of focus, the client browser losses its visibility. The client browser may keep receiving video update from the BMC and keep updating the video in canvas even the client browser is not in visible state, which unnecessarily occupies the CPU/memory and the browser.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system includes a BMC of a host. The BMC redirects images from the host to a device for displaying at a redirection display. The BMC further receives an indication that the redirection display is no longer in an active mode. The BMC then stops redirecting the images from the BMC to the device in response to the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
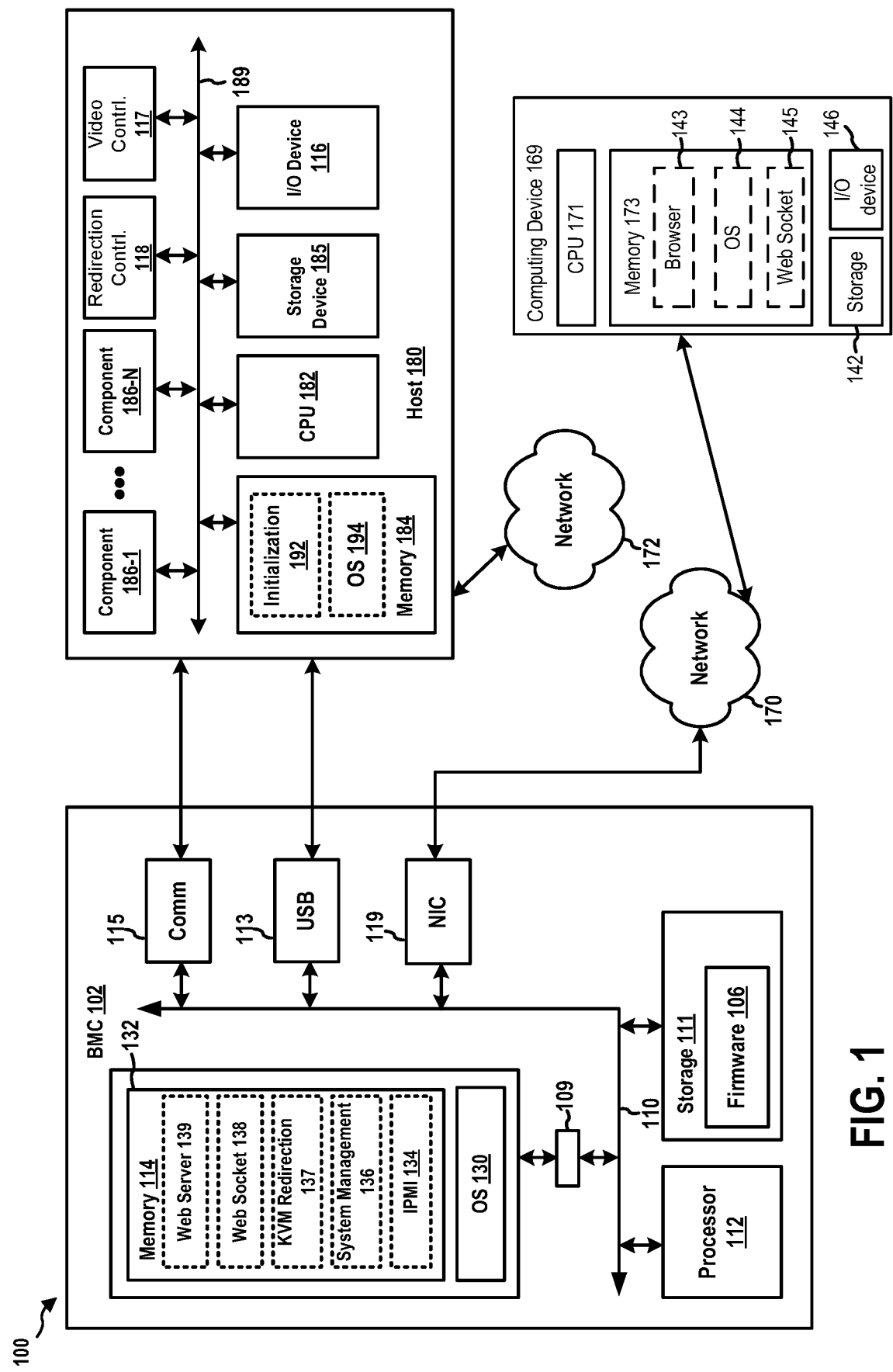
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a BMC 102 and a host computer 180. The BMC 102 has, among other components, a processing unit 112, a memory 114, a memory driver 109, a storage 111, a network interface card 119, a USB interface 113 (Universal Serial Bus), and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 109, the storage 111, the network interface card 119, the USB interface 113, and/or the communication interfaces 115 may be on the same chip. In addition, the memory 114, the processing unit 112, the memory driver 109, the storage 111, the communication interfaces 115, and/or the network interface card 119 may be in communication with each other through a communication channel 110 such as a bus architecture.

The BMC 102 may store BMC firmware 106 in the storage 111. The storage 111 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134, a system management component 136, a KVM redirection component 137, a web socket 138, and a web server 139. Further, the service components 132 may be implemented as a service stack. As such, the BMC firmware 106 can provide an embedded system to the BMC 102.

More specifically, the KVM redirection component 137 implements KVM redirection functionalities. The web socket 138 can establish full-duplex communications channels under the Web Socket protocol over a single transmission connection protocol (TCP) connection. The web server 139 can provide web contents accessible through the Internet. Details of the modules will be described later.

The BMC 102 may be in communication with the host computer 180 through the USB interface 113, the network interface card 119, the communication interfaces 115, and/or the IPMI interface.

The host computer 180 includes a host CPU 182, a host memory 184, a storage device 185, at least one I/O device 116, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Examples of the I/O device 116 include keyboards, touch pads, mouse, microphones, display screens, touch screens, or other I/O devices applicable for the host computer 180. Further, the component devices 186-1 to 186-N can include hardware components of a computer 602 shown in FIG. 6. The host computer 180 also includes a video controller 117 that output video signals, and a redirection controller 118 as the I/O port for the video redirection.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 192 may include one or more UEFI boot services.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a computing device 169 may communicate with the BMC 102. For example, the computing device 169 may send IPMI messages to the BMC 102 over the communication network 170.

The computing device 169 includes a CPU 171, a memory 173, and storage 142. The storage 142 is a data storage media for storing the OS and other applications of the computing device 169. Examples of the storage 142 of the computing device 169 may include flash memory, memory cards, USB drives, hard drives, floppy disks, optical drive, or any other types of data storage devices. A browser program 143 can be loaded in the memory 173 and executed by the CPU 171 of the computing device 169. The browser program 143 is a software application for retrieving, presenting and traversing information resources to the user. Further, the browser program 143 can serve as a KVM redirection client of the system 100 for communicating with the BMC 102. Generally, the browser program 143 may retrieve the information resources provided on an open network, such as the Internet. The information resources may include web page, image, video or other types of data contents. Further, the memory 173 can load an OS 144 and a Web Socket module 145. The Web Socket module 145 is a module corresponding to the web socket 138 of the BMC 102 on the host computer 180, such that the full-duplex communications channels under the Web Socket protocol may be established between the BMC 102 and the computing device 169. Further, the computing device 169 has at least one I/O device 146. Examples of the I/O device 146 include keyboards, touch pads, mouse, microphones, display screens, touch screens, or other I/O devices applicable for the computing device 169. Some I/O devices, such as touch screens, are provided for the dual input/output purposes for the computing device 169.

For displaying the information resources such as the web pages and other data contents using the browser program 143, HyperText Markup Language (HTML) is a standardized markup language in a web-based language format for displaying the web pages and other information that can be displayed in the browser program 143. Data in the HTML format is written in the form of HTML elements, or tags, which are enclosed in angle brackets (such as _html_), within the web page contents. Currently, the HTML format is widely adopted by almost all of the browser programs on the market, and is thus suitable as the web-based language format of the communicating instructions between the browser program 143 on the computing device 169 side and the web server 139 of the BMC 102 on the host computer 180 side.

Generally, a scripting language such as JavaScript is used in addition to the HTML format language to control input and output of the user interface. Further, HTML5, which is the currently developing revision of the HTML language, provides extensive features for web storage, which utilizes web application software methods and protocols used for storing data through a web browser. Older common used browser programs do not support the HTML5 format, but the browser programs supporting the HTML5 format include MOZILLA FIREFOX 1.5, GOOGLE CHROME 4.0, SAFARI 3.1, SAFARI MOBILE 3.2, OPERA 9.0, OPERA MOBILE 10.0, ANDROID BROWSER 2.1, AND INTERNET EXPLORER 9.0, or any newer version of these browser programs. Thus, the browser program 143 can support HTML5 and can be one of the browser programs listed above.

The browser program 143 can communicate with the web server 139 at the BMC using the Hypertext Transfer Protocol (HTTP). Specifically, the browser program 143 may send an HTTP request to the web server 139. Upon receiving the HTTP request, the server sends an HTTP response in response to the HTTP request to the browser program.

The web server 139 typically cannot initiate a data transmission to the browser program 143 under HTTP. Web Socket can provide full-duplex communications channels over a single TCP connection such that the server may actively send instruction or information to the client. Web Socket is incorporated into HTML5, and thus is supported by web browsers and servers implementing HTML5.

Figure 2:
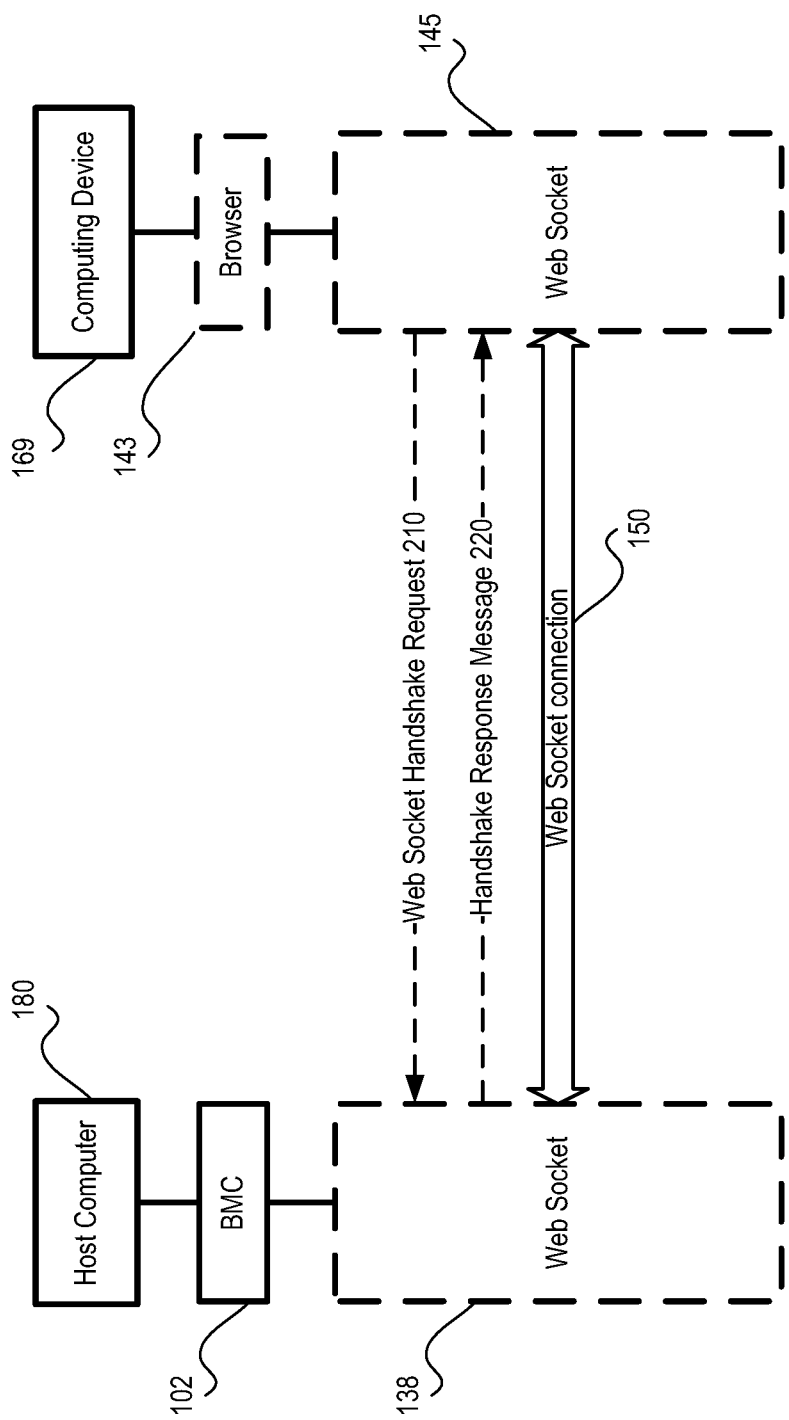
FIG. 2 shows a process of establishing the Web Socket connection between the BMC and the embedded-system device.

FIG. 2 shows a process of establishing the Web Socket connection between the BMC 102 and the computing device 169 according to one embodiment of the disclosure. The Web Socket connection starts in a similar way to the HTTP connection, but provides continuous two-way web-based connection between the host computer 180 and the browser program 124. When the browser program 143 attempts to establish a Web Socket connection, the browser program 143 instructs the Web Socket module 145 to send a Web Socket handshake request to port 80 (the default HTTP port) or port 443 (the HTTPS port) of the web socket 138 of the BMC 102. The Web Socket handshake request resembles the GET command used in the HTTP request, but includes more Web Socket instructions and can be seen as an upgraded request. Upon receiving a Web Socket handshake request 210, the web server 139 can identify the request as the Web Socket handshake request and not an HTTP request according to the upgraded information in the Web Socket handshake request. The web server 139 sends a handshake response message 220 to the browser program 143. Accordingly, a Web Socket connection 150 can be established between the browser program 143 and the web server 139.

Figure 3:
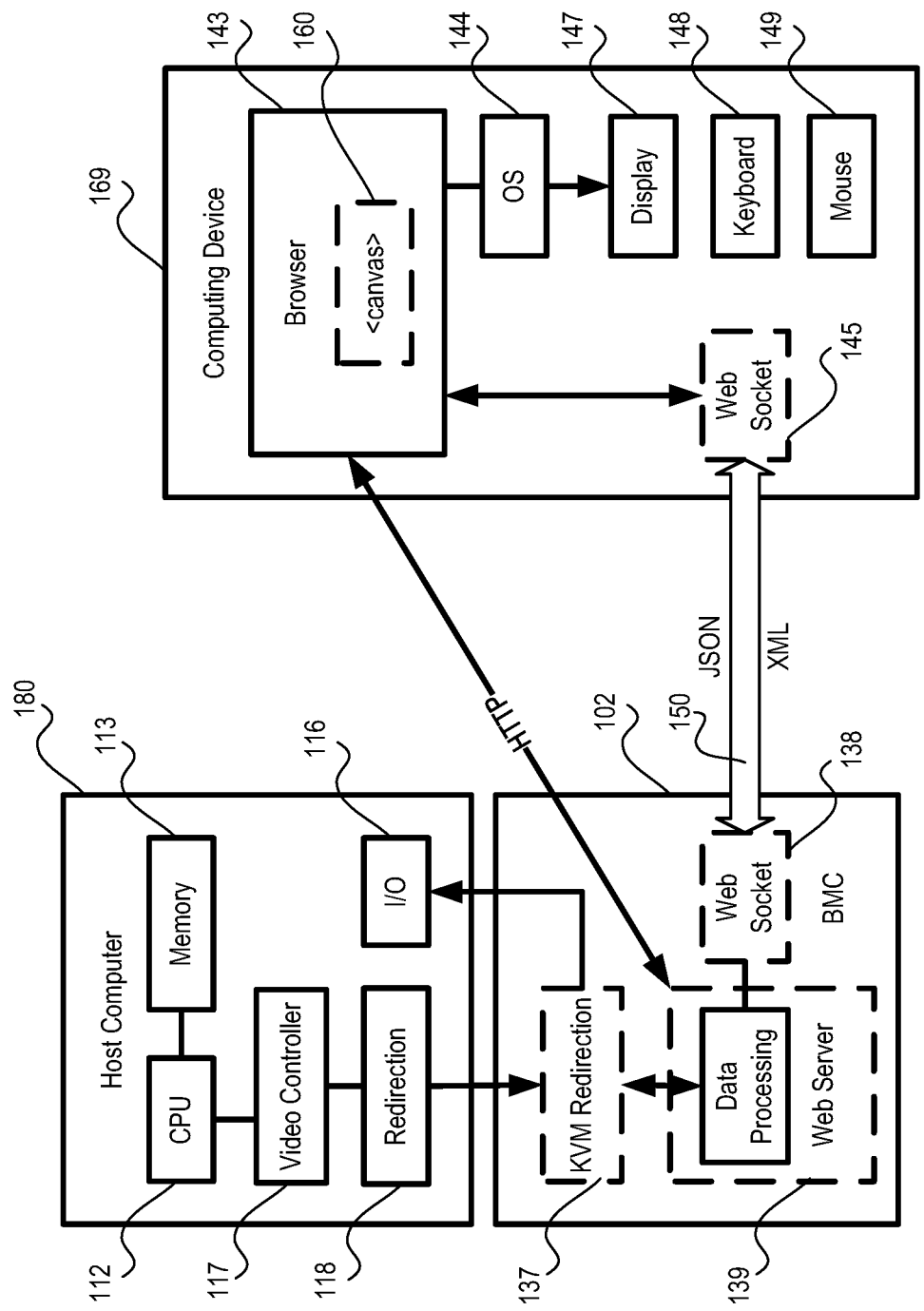
FIG. 3 schematically depicts a web-based KVM redirection.

FIG. 3 schematically depicts the web-based KVM redirection according to one embodiment of the present disclosure. As shown in FIG. 3, a Web Socket connection 150 is established between the BMC 102 and the computing device 169. As described supra, the video controller 117 outputs video signals, and the redirection controller 118 in turn redirects the video signals. The KVM redirection component 137 of the BMC 102 in this embodiment is connected to the redirection controller 118 and the I/O device 116. The KVM redirection component 137 can receive redirected video frames from the redirection controller 118 and send keyboard and mouse input signals to the I/O device 116. The computing device 169 includes a display device 147 and input devices such as a keyboard 148, a mouse 149, and a touch panel. Although not explicitly shown, the host computer 180 and the computing device 169 may include other elements to perform the web-based KVM redirection.

Figure 4:
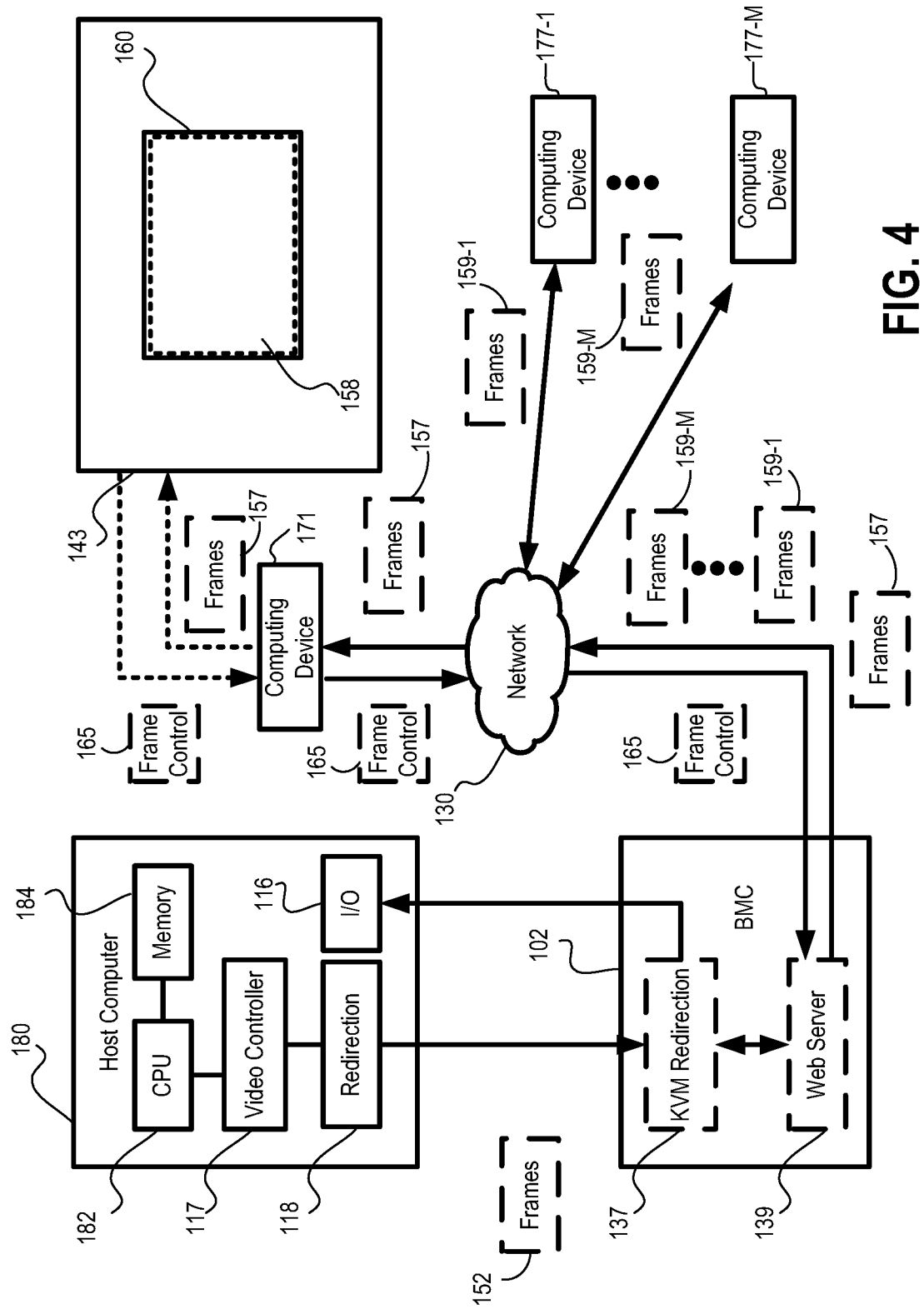
FIG. 4 schematically depicts the web-based KVM redirection.

FIG. 4 schematically depicts a web-based KVM redirection according to certain embodiments of the present disclosure. As described supra, the video controller 117 outputs video signals. For example, the video signals can be output to a display device for display. The video controller 117 is in communication with the redirection controller 118, which captures the video signals and generates video frames. The redirection controller subsequently sends the video frames to the KVM redirection component 137 of the BMC 102.

For example, the KVM redirection component 137 receives the video frames 152 from the host computer 180, processes the video frames, to generate redirection images, and sends the redirection images to the web server. The web server, upon request from a browser running on the computing device 169, sends a KVM redirection webpage to the browser. The browser, under the instruction of the webpage, can retrieve the redirection images from the web server.

In certain embodiments, the web server is configured to generate a KVM redirection webpage utilizing canvas supported by HTML5. The redirection webpage contains canvas tags that define a drawable region of the browser display page. The canvas tag is one of the elements provided by the HTML5 for processing image and video files, allowing dynamic, scriptable rendering of shapes and bitmap images. The canvas tag defines the height and width attributes of the drawable region. A JavaScript code may access the drawable region through a full set of drawing functions, and display dynamically generated images on the drawable region defined by the canvas tag. The canvas tag has no drawing abilities of its own, and can be seen as a container of the images. Generally, the canvas tag has an ID that can be referenced by the JavaScript code. FIG. 4 shows the KVM redirection page rendered by the browser program 143 has a canvas 160.

Based on the configuration information input by a user, or alternatively a default configuration, the web server can set the size of the canvas in the KVM redirection web page. For example, the user may desire to have the same resolution as the resolution of video frames output by the video controller. In other words, each pixel of the video frame output by the video controller has a respective corresponding pixel on the canvas. For example, if the video resolution of the video frame is 1024*768, the canvas defined by the canvas tag may accordingly have a width of 1024 and a height of 768. As another example, the user may desire to have half of the resolution of the video frame. Thus, if the video resolution of the video frame is 1024*768, the canvas defined by the canvas tag may have a width of 512 and a height of 384. The below description, in general, uses a one-to-one corresponding relationship between the resolution of the video frame and the resolution of the canvas as an example. One skilled in the art should appreciate that the techniques discussed below similarly apply to canvas having resolution according to other corresponding relationship to the resolution of the video frame.

The KVM redirection component 137 receives the video frames 152 from the redirection controller 118 of the host computer 180. When the video frames 152 is received by the KVM redirection component 137, the KVM redirection component 137 generates redirection frame data 157 and sends the redirection frame data 157 to the web server 139. The redirection frame data 157 are in a format that can be rendered by the browser program 143.

In certain configurations, computing devices 177-1 to 177-M may also request the KVM redirection component 137 to redirect the video frames 152 to the computing devices 177-1 to 177-M. Accordingly, the KVM redirection component 137 may additionally generates redirection frame data 159-1 to 159-M and send the redirection frame data 159-1 to 159-M to the computing devices 177-1 to 177-M, respectively.

As described supra, after that the KVM redirection component 137 is configured to redirect the video frames 152 to the computing device 169, in certain configurations, the KVM redirection component 137 continuously captures the video frames 152 sent from the host computer 180 and generates the redirection frame data 157. The web server 139 then sends the redirection frame data 157 to the browser program 143 through the web socket 138. Upon receiving the redirection frame data 157, the browser program 143 can process the redirection frame data 157 and display the redirected images on the canvas 160 under the instruction of the code in the KVM redirection web page.

In certain circumstances, the browser program 143 is out of focus (e.g., another program is displayed on top of the browser program 143) or is minimized on the computing device 169. In other words, the browser program 143 may have lost its visibility on the computing device 169. Nonetheless, when the browser program 143 continues receiving the redirection frame data 157 from the BMC 102, the browser program 143 accordingly continues processing the redirection frame data 157 and displays the redirected images 158 on the canvas 160. As the browser program 143 may not be visible, the computing power of the computing device 169 may have been unnecessarily spent on processing the redirection frame data 157 and displaying the redirected images 158.

In one technique, the KVM redirection web page contains code or instructions that the browser program 143 to send event objects to the KVM redirection web page when the browser program 143 is out of focus or minimized. Further, upon receiving such an event from the browser program 143, the KVM redirection web page further generates a frame control message 165 to indicate that the browser program 143 is not active (e.g., the browser program 143 is out of focus or is minimized). The KVM redirection web page further instructs the browser program 143 to send the frame control message 165 to the web server 139 through the connection established between the Web Socket module 145 and the web socket 138.

At the BMC 102, the web server 139 receives the frame control message 165 from the computing device 169. The web server 139 extracts an indication from the frame control message 165 and sends the indication to the KVM redirection component 137. The KVM redirection component 137 determines that the browser program 143 is not active based on the indication. The KVM redirection component 137 further determines whether the KVM redirection component 137 only redirects the video frames 152 to the computing device 169 and not to any other devices. When the computing device 169 is the only device that receives the redirection, the KVM redirection component 137 may decide not to further capture the video frames 152 sent from the host computer 180 while the browser program 143 is not active. Accordingly, the KVM redirection component 137 stops generating the redirection frame data 157 based on the video frames 152. As such, the web server 139 has no more redirection frame data 157 to be transmitted to the browser program 143, and the browser program 143 no longer receives the redirection frame data 157. Therefore, the browser program 143 does not unnecessarily use the CPU 171 and the memory 173 to process and display the redirection frame data 157 on the canvas 160 when the browser program 143 is not visible.

When the computing device 169 is not the only device that receives the redirection, the KVM redirection component 137 continues capturing the video frames 152 sent from the host computer 180. For example, the KVM redirection component 137 may be configured to provide redirection to the computing devices 177-1 to 177-M. The KVM redirection component 137 may stop generating the redirection frame data 157 for the computing device 169, while it continues generating the redirection frame data 159-1 to 159-M for the computing devices 177-1 to 177-M, respectively. Therefore, the web server 139 does not transmit the redirection frame data 157 to the computing device 169, while it continues transmit the redirection frame data 159-1 to 159-M to the computing devices 177-1 to 177-M, respectively. As such, the browser program 143 no longer receives the redirection frame data 157. Therefore, the browser program 143 does not unnecessarily use the CPU 171 and the memory 173 to process and display the redirection frame data 157 on the canvas 160 when the browser program 143 is not visible.

Subsequently, when the browser program 143 becomes active (i.e., the browser program 143 is in focus and no longer minimized), the browser program 143 may send to the KVM redirection web page an event indicating the browser program 143 is active. In response to receiving the event, the KVM redirection web page may generate another frame control message 165 to indicate that the browser program 143 is active. Further, the KVM redirection web page may instruct the browser program 143 to send the frame control message 165 to the BMC 102.

At the BMC 102, the web server 139 receives the frame control message 165 from the computing device 169. The web server 139 extracts an indication from the frame control message 165 and sends the indication to the KVM redirection component 137. The KVM redirection component 137 determines that the browser program 143 is again active based on the indication. If the KVM redirection component 137 has stopped capturing the video frames 152 due to inactivity of the browser program 143, the KVM redirection component 137 resumes capturing the video frames 152.

In certain circumstances that the KVM redirection component 137 no longer generates the redirection frame data 157 due to inactivity of the browser program 143, the KVM redirection component 137 resumes generating the redirection frame data 157 according to the redirection frame data 157. Subsequently, the KVM redirection component 137 forwards the redirection frame data 157 to the web server 139, which in turn sends the redirection frame data 157 to the browser program 143 through the web socket 138 and the Web Socket module 145. The browser program 143, upon receiving the redirection frame data 157, further processes the redirection frame data 157 and displays the redirected images 158 on the canvas 160.

Figure 5:
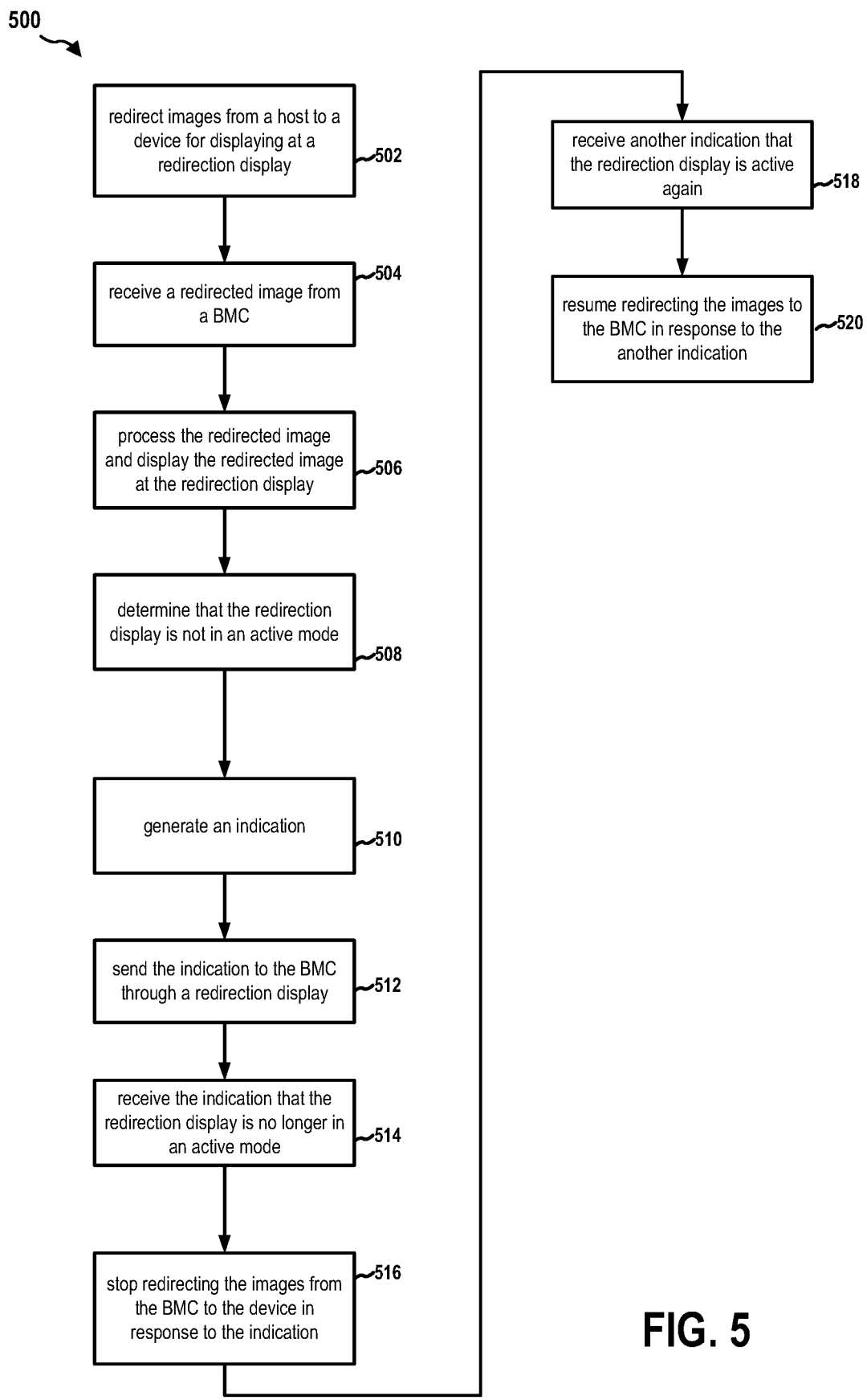
FIG. 5 is a flow chart a method (process) for updating firmware of host devices.

FIG. 5 is a flow chart 500 of a method (process) for updating firmware of host devices. The method may be performed by a computer system (e.g., the computer system 100) including a host (e.g., the host computer 180), a BMC (e.g., the BMC 102), and a device (e.g., the computing device 169).

At operation 502, the BMC redirects images (e.g., the video frames 152) from the host to the device for displaying at a redirection display (e.g., the browser program 143). At operation 504, the device receives a redirected image (e.g., the redirection frame data 157) from the BMC. At operation 506, the device processes the redirected image and displaying the redirected image at the redirection display. At operation 508, the device determines that the redirection display is not in an active mode (e.g., out of focus or minimized). In certain configurations, the redirection display is an HTML 5 browser. To determine that the redirection display is not in the active mode, the device determines that the HTML 5 browser is out of focus or is minimized.

At operation 510, the device generates an indication (e.g., the frame control message 165). At operation 512, the device sends the indication to the BMC through the redirection display. At operation 514, the BMC receives the indication that the redirection display is no longer in the active mode. At operation 516, the BMC stops redirecting the images from the BMC to the device in response to the indication.

In certain configurations, to stop redirecting, the BMC stop generating redirected images (e.g., the redirection frame data 157) for the device or stopping sending the redirected images to the device. In certain configurations, to stop redirecting, the BMC determines that the images from the host is not redirected to any other device (e.g., the computing devices 177-1 to 177-M). The BMC further stops capturing subsequent images from the host. In certain configurations, the BMC redirects the images from the host to one or more other devices. The BMC continues the redirection to the one or more other devices when the redirection to the device is stopped. At operation 518, the BMC receives another indication (e.g., the frame control message 165) that the redirection display is active again. At operation 520, the BMC resumes redirecting the images to the BMC in response to the another indication.

Figure 6:
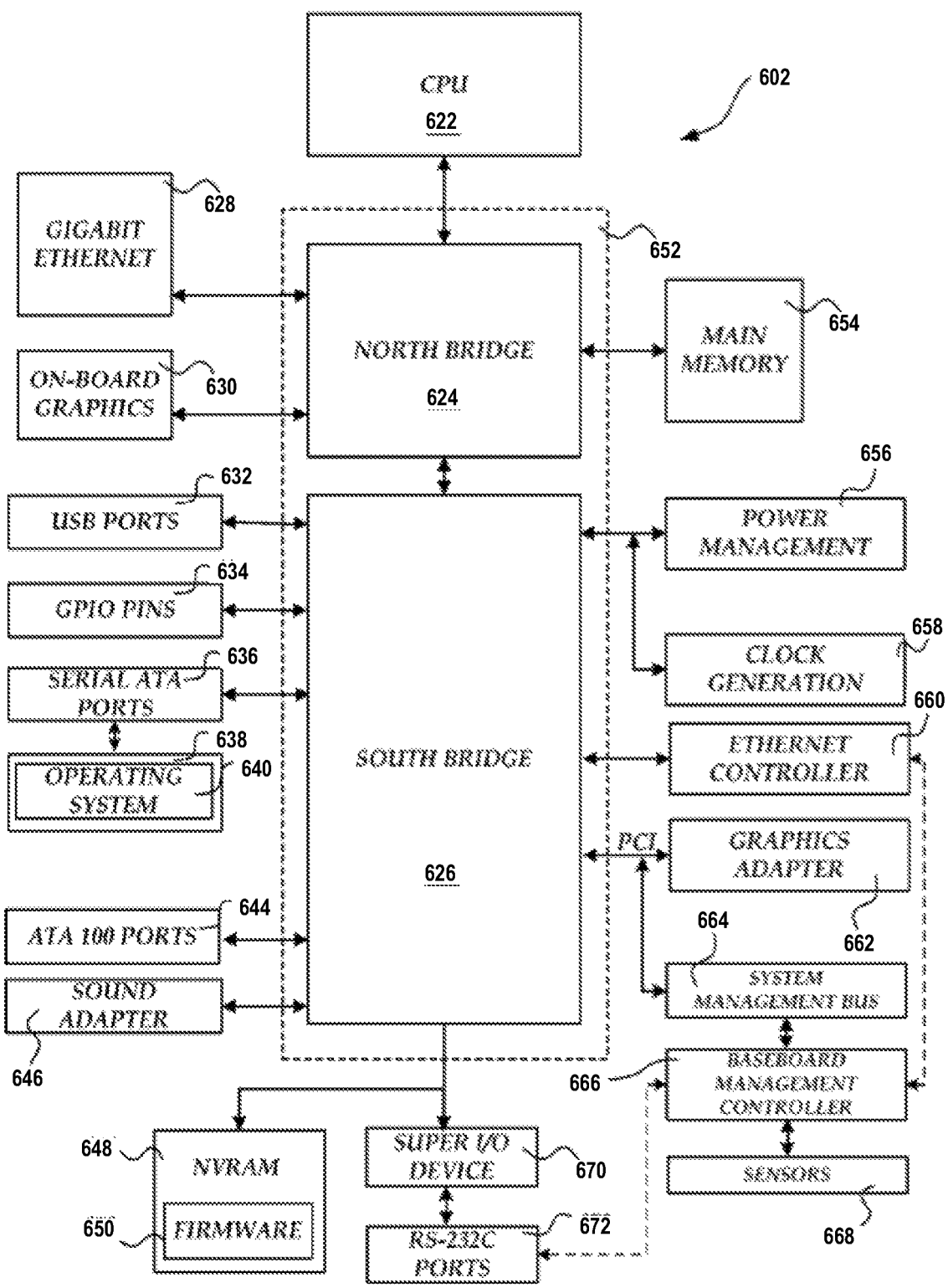
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 180, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the BMC 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, the computer system including a baseboard management controller (BMC) of a host and a device, comprising:
    redirecting, at the BMC, images from the host to the device for displaying at a web browser of the device;
    receiving, at the device, a redirected image from the BMC;
    processing, at the device, the redirected image and displaying the redirected image at the web browser;
    determining, at the device, that the web browser at the device is out of focus or is minimized;
    generating, at the device, an indication that the web browser at the device is out of focus or is minimized;
    sending, at the device, a frame control message including the indication to the BMC through the web browser;
    receiving, at the BMC, the frame control message including the indication from the device;
    stopping, at the BMC, redirecting the images from the BMC to the device in response to the indication;
    receiving, at the BMC, another frame control message from the device, the another frame control message including another indication that the web browser is in focus; and
    resuming, at the BMC, redirecting the images to the web browser in response to the another indication.

2. The method of claim 1, wherein the web browser is an HTML 5 browser.

3. The method of claim 1, wherein the stopping redirecting includes
    stopping generating redirected images for the device or stopping sending the redirected images to the device.

4. The method of claim 1, wherein the stopping redirecting includes
    determining that the images from the host is not redirected to any other device; and
    stopping capturing subsequent images from the host.

5. The method of claim 1, further comprising:
    redirecting the images from the host to one or more other devices; and
    continuing the redirection to the one or more other devices when the redirection to the device is stopped.

6. A computer system, comprising:
    a device, including
        a second memory; and
        second at least one processor coupled to the second memory and configured to:
            receive, at the device, a redirected image from the BMC;
            process, at the device, the redirected image and displaying the redirected image at the web browser;
            determine, at the device, that the web browser at the device is out of focus or is minimized;
    generate, at the device, an indication that the web browser at the device is out of focus or is minimized;
    send, at the device, a frame control message including the indication to the BMC through the web browser; and
    a baseboard management controller (BMC) of a host, including
    a first memory; and
    first at least one processor coupled to the first memory and configured to:
        redirect, at the BMC, images from the host to a device for displaying at a web browser;
        receive, at the BMC, the frame control message including the indication from the device;
        stop, at the BMC, redirecting the images from the BMC to the device in response to the indication;
        receive, at the BMC, another frame control message from the device, the another frame control message including another indication that the web browser is in focus; and
        resume, at the BMC, redirecting the images to the web browser in response to the another indication.

7. The computer system of claim 6, wherein the web browser is an HTML 5 browser.

8. The computer system of claim 6, wherein to stop redirecting, the first at least one processor is further configured to:
    stop generating redirected images for the device or stopping sending the redirected images to the device.

9. The computer system of claim 6, wherein to stopping redirecting, the first at least one processor is further configured to:
    determine that the images from the host is not redirected to any other device; and
    stop capturing subsequent images from the host.

10. The computer system of claim 6, wherein the first at least one processor is further configured to:
    redirect the images from the host to one or more other devices; and
    continue the redirection to the one or more other devices when the redirection to the device is stopped.

11. A non-transitory computer-readable medium storing computer executable code for operating a computer system, the computer system including a baseboard management controller (BMC) of a host and a device, comprising code to:
    redirect, at the BMC, images from the host to the device for displaying at a web browser;
    receive, at the device, a redirected image from the BMC;

process, at the device, the redirected image and displaying the redirected image at the web browser;

determining, at the device, that the web browser at the device is out of focus or is minimized;

generating, at the device, an indication that the web browser at the device is out of focus or is minimized;

sending, at the device, a frame control message including the indication to the BMC through the web browser;

receive, at the BMC, the frame control message including the indication from the device;

stop, at the BMC, redirecting the images from the BMC to the device in response to the indication;

receive, at the BMC, another frame control message from the device, the another frame control message including another indication that the web browser is in focus; and resume, at the BMC, redirecting the images to the web browser in response to the another indication.

12. The non-transitory computer-readable medium of claim 11, wherein the web browser is an HTML 5 browser.

* * * * *